United States Patent
Shimajiri

(10) Patent No.: US 8,100,453 B2
(45) Date of Patent: Jan. 24, 2012

(54) LID DEVICE OPENED AT BOTH SIDES AND CENTER CONSOLE BOX

(75) Inventor: Naohiro Shimajiri, Toyota (JP)

(73) Assignee: Nifco, Inc., Kanagawa (JP)

( * ) Notice: Subject to any disclaimer, the term of this patent is extended or adjusted under 35 U.S.C. 154(b) by 210 days.

(21) Appl. No.: 12/224,836

(22) PCT Filed: Jan. 31, 2007

(86) PCT No.: PCT/JP2007/051630
§ 371 (c)(1),
(2), (4) Date: Sep. 8, 2008

(87) PCT Pub. No.: WO2007/105383
PCT Pub. Date: Sep. 20, 2007

(65) Prior Publication Data
US 2009/0200825 A1    Aug. 13, 2009

(30) Foreign Application Priority Data
Mar. 14, 2006 (JP) .................................. 2006-069875

(51) Int. Cl.
*B65D 43/26* (2006.01)
*B60R 7/04* (2006.01)
(52) U.S. Cl. ..................... 296/37.8; 296/24.3; 220/263
(58) Field of Classification Search ............... 296/24.34, 296/24.3, 37.8; 220/810, 817, 830, 827, 220/264, 263; 49/193
See application file for complete search history.

(56) References Cited

U.S. PATENT DOCUMENTS

| 3,321,100 | A |   | 5/1967  | Toma |
|-----------|---|---|---------|------|
| 5,067,625 | A | * | 11/1991 | Numata ........................ 220/827 |
| 5,210,906 | A | * | 5/1993  | Aihara et al. ................... 16/232 |
| 5,357,652 | A |   | 10/1994 | Yamada |
| 6,142,333 | A | * | 11/2000 | Sasamoto et al. ............. 220/264 |

FOREIGN PATENT DOCUMENTS

| FR | 1 074 458 A | 10/1954 |
| JP | U S55-117568 | 8/1980 |
| JP | U S62-141875 | 9/1987 |
| JP | H03-007636 | 1/1991 |
| JP | H-03-189249 | 8/1991 |
| JP | H04-237783 | 8/1992 |
| JP | H04-238982 | 8/1992 |
| JP | H07-011835 | 1/1995 |

* cited by examiner

*Primary Examiner* — Glenn Dayoan
*Assistant Examiner* — Melissa A Black
(74) *Attorney, Agent, or Firm* — Manabu Kanesaka

(57) ABSTRACT

A linkage member 3 is pivotally supported, through a first shaft 30, by an article 1 having an opening, is supported, through a second shaft 31, by a lid member 2, and includes a latch 32 engageable with a latch receiver 12 disposed in the article 1. The lid member 2 has an engageable end 201 disposed therein so as to be receivable into an engagement hole 34 formed in the linkage member 3 and further has a switching member 20 disposed therein so as to be movable to selectively set the engageable end 201 in an advanced position to place the engageable end in a most deepest position in the linkage member 3 through the engagement hole 34, in a retracted position to take the engageable end out of the engagement hole 34, and in an intermediate position between both of the advanced position and the retract position. When the engageable end 201 of the switching member 20 is set in the advanced position, the engageable end brings the latch 32 out of engagement with the latch receiver 12.

7 Claims, 15 Drawing Sheets

LID DEVICE OPENED AT BOTH SIDES AND CENTER CONSOLE BOX

TECHNICAL FIELD

The present invention relates to a lid device openable from both sides, which allows a lid for closing an opening of an article having the opening formed therein to be swung and opened, being pivoted about either one of opposite edges of the opening, and a center console box utilizing the same.

BACKGROUND ART

Patent Document 1 identified below has disclosed an opening and closing device, which has shafts disposed on two sides at opposite positions of an article having an opening, and has systems for detachably engaging the shafts therewith, disposed on the two sides at opposite positions with respect to an opening and closing member for closing the opening, whereby the opening and closing member is allowed to be pivoted about either one of the shafts at the two sides.

Also, Patent Document 2 identified below has disclosed an opening and closing device, which has shaft portions disposed on two sides at opposite positions of an article having an opening, the shaft portions being supported by swingable poles for engagement, and has locking systems disposed on the two sides at opposite positions of an opening and closing member for closing the opening, each of the locking systems having a groove for detachably engaging a shaft therewith, whereby the opening and closing member is allowed to be pivoted about either one of the shaft portions at the two sides.

However, each of the conventional opening and closing devices needs to engage and disengage a desired shaft or a desired shaft portion with the corresponding structure or groove as the pivotal shaft for the opening and closing member whenever the opening and closing member is opened and closed. This arrangement makes it difficult to simplify the arrangement and is susceptible to be worn at portions where engagement and disengagement are frequently made, which is difficult to ensure a wobble-free operation and a stable operation for a long period of time.

Patent Document 1: Japanese Patent No. 3052153
Patent Document 2: Japanese Patent No. 3052152

DISCLOSURE OF THE INVENTION

Object to be Accomplished by the Invention

It is a main object of the present invention to provide such a type of lid device (opening and closing device) openable from both sides, which is easy to make the arrangement simply and operates stably for a long period of time.

Means to Accomplish the Object

In order to attain the object, the present invention provides a lid device openable from both sides, which includes the following features (1) to (4):

(1) the lid device openable from both sides, including a lid member and a linkage member;

(2) the linkage member having one end pivotally supported, through a first shaft, by an article having an opening closable by the lid member, and the other end supported, through a second shaft parallel with the first shaft, by the lid member, the linkage member including a latch engageable with a latch receiver disposed in the article and further including a biasing member for biasing the latch so as to constantly set a latch end in a position to be brought into engagement with the latch receiver; and (3) the lid member having an engageable end disposed therein so as to be receivable into an engagement hole formed in a portion of the linkage member between opposite ends of the linkage member, and further having a switching member disposed therein so as to be movable to selectively set the engageable end in an advanced position to place the engageable end in a most deepest position in the linkage member through the engagement hole, in a retracted position to take the engageable end out of the engagement hole, and in an intermediate position between both of the advanced position and the retract position;

(4) whereby when the engageable end of the switching member is set in the advanced position, the engageable end causes the latch to be pressed in a direction against a biasing action to be brought out of engagement with the latch receiver.

When the engageable end of the switching member is set in the advanced position, the lid member is coupled with the linkage member at two locations of the second shaft and the engageable end of the switching member while the article is coupled with the linkage member only by the first shaft. Thus, it is possible to swing and open the lid member about the first shaft without bringing the lid member out of engagement with the linkage member in that time (hereinbelow, referred to as the first shaft side swinging state).

When the engageable end of the switching member is set in the intermediate position, the engageable end is brought into engagement with the engagement hole of the linkage member without bringing the latch out of engagement with the latch receiver. In that time, the lid member is coupled with the linkage member at two locations of the second shaft and the engageable end of the switching member while the article is coupled with the linkage member at two locations of the first shaft and a combination of the latch and the latch receiver. Thus, it is not possible to swing and open the lid member about the first shaft or the second shaft, with the result that the lid member is kept closed in that time (hereinbelow, referred to as the unswingable state).

When the engageable end of the switching member is set in the retracted position, the engageable end is brought out of engagement with the engagement hole of the linkage member with the latch being brought into engagement with the latch receiver. In that time, the lid member is coupled with the linkage member only by the second shaft while the article is coupled with the linkage member at two locations of the first shaft and a combination of the latch and the latch receiver. Thus, it is possible to swing and open the lid member about the second shaft without bringing the linkage member and the article out of engagement in that time (hereinbelow, referred to as the second shaft side swingable state).

The lid member that is closed from an opened state is stably set to keep the opening closed by bringing the latch in engagement with the latch receiver of the article in the first shaft side swingable state and by bringing the engageable end of the switching member into engagement with the engagement hole of the linkage member left on the article in the second shaft side swingable state.

The lid device may be configured so that wherein the linkage member is formed of a first linkage, member and a second linkage member;

that the lid member is assembled, through the first linkage member, to the article on a first end of the lid member;

that the lid member is assembled, through the second linkage member, to the article on a second end of the lid member;

that the second linkage member has a second shaft substantially positioned on an imaginary straight line passing through a first shaft of the first linkage member;

that the second linkage member has a first shaft substantially positioned on an imaginary straight line passing through a second shaft of the first linkage member; and that the switching member includes a first engageable end for the first linkage member and a second engageable end for the second linkage member;

whereby when the first engageable end of the switching member is moved to the advanced position, the second engageable end is moved to the retracted position, and when the second engageable end of the switching member is moved to the advanced position, the first engageable end is moved to the retracted position.

In this case, when the first engageable end of the switching member is moved to the advanced position, the first end of the lid member is set in the first shaft side swingable state while the second end of the lid member is set in the second shaft side swingable state. In this situation, since the second shaft of the second linkage member is substantially positioned on the imaginary straight line passing through the first shaft of the first linkage member, it is possible to swing and open the lid member.

When the second engageable end of the switching member is moved to the advanced position, the second end of the lid member is set in the first shaft side swingable state while the first end of the lid member is set in the second shaft side swingable state. In this situation, since the first shaft of the second linkage member is substantially positioned on the imaginary straight line passing through the second shaft of the first linkage member, it is possible to swing and open the lid member in such a way that an end of the lid member, which is opposite to the end of the lid member serving as a free end in the former case, serves as a free end.

When both of the first engageable end and the second engageable end of the switching member are not in the advanced position, both of the first engageable end and the second engageable end are in the intermediate position. In that time, the lid member keeps the opening of the article closed since the lid member is not swingable on both of the first end and the second end.

When the lid member is configured to be supported at both opposite sides thereof as described above, the lid member is swung and opened in a stable manner in particular.

The lid device may be configured so that wherein the switching member is configured to be movable in a direction along the imaginary straight lines and includes a control member for the switching member, which is disposed in the lid member so as to be movable in both directions perpendicular to the imaginary straight lines;

that both of the first engageable end and the second engageable end of the switching member are set in the intermediate position when the control member is set in a reference position; and that the lid member includes a return system, which pushes the control member back to the reference position when the control member has been moved from the reference position.

In this case, by depressing the control member on a side of the lid member where the opening operation is performed, it is possible to open the lid member with this side serving as a free end in the embodiment. Since the control member is returned to the reference position by the return system after the lid member starts to be opened by depressing the control member in this way, both of the first engageable end and the second engageable end of the switching member are returned to the intermediate position. After the switching member is once moved in a direction against the pushing action of the return system when the lid member is set from an opened state into the closed state, the first engageable end and the second engageable end are brought into engagement with the engagement holes in the first linkage member and the second linkage member to stably keep the lid member closed.

The lid device may be configured so that the lid member is constantly biased in a direction to be swung and opened about the second shaft by a torsion coil spring disposed around the second shaft of the linkage member. In this case, it is possible to swing and open the lid member by the biasing action of the spring.

The lid device may be configured so that wherein a damper is disposed laterally of the second shaft, the damper having a pinion brought into engagement with a gear disposed in the link member swingable about the second shaft and being configured to apply a braking force to the pinion.

This arrangement allows the lid member to be swung and open in a slow manner, providing sophistication to the lid device or an article with the lid device applied thereto, such as an appliance or furniture.

In order to attain the above-mentioned object, the present invention provides a center console box including a lid member formed as a lid, an article formed as box, and an imaginary line passing through a first shaft and a second shaft and extending in a right-to-left direction of an automobile, the lid member, the article, the first shaft and the second shaft disposed in the above-mentioned lid.

In the center console box configured as described above, it is possible not only to erect and swing the lid from a front passenger's seat so as to pivot the lid about an edge of the opening of the box close to a driver's seat but also to erect and swing the lid from the driver's seat so as to pivot the lid about an edge of the opening close to the front passenger's seat. Or, it is possible not only to erect and swing the lid from a rear seat so as to pivot the lid about an edge of the opening of the box close to a front seat but also to erect and swing the lid from the front seat so as to pivot the lid about an edge of the opening close to the rear seat.

Effects of the Invention

The lid device openable from both sides according to the present invention and a center console box utilizing the lid device according to the present invention are configured so that the lid member (the lid in the case of a center console box) is linked to an article having an opening formed therein (the box in the case of the center console box) through the linkage member pivotally supported by the article through the first shaft and pivotally supported by the lid member through the second shaft, that when the linkage member is brought out of engagement with the article, it is possible to swing and open both of the lid member and the linkage member about the first shaft while the linkage member is brought out of engagement with the lid member, it is possible to swing and open only the lid member about the second shaft from a side opposite to the former case. The device according to the present invention has a simple structure and stably operates for a long period of time since the first shaft and the second shaft as the swingable centers are not frequently subjected to engagement and disengagement operations.

BEST MODE FOR CARRYING OUT THE INVENTION

Now, an embodiment of the present invention will be described with reference to FIG. 1 to FIG. 17.

Figure 1:
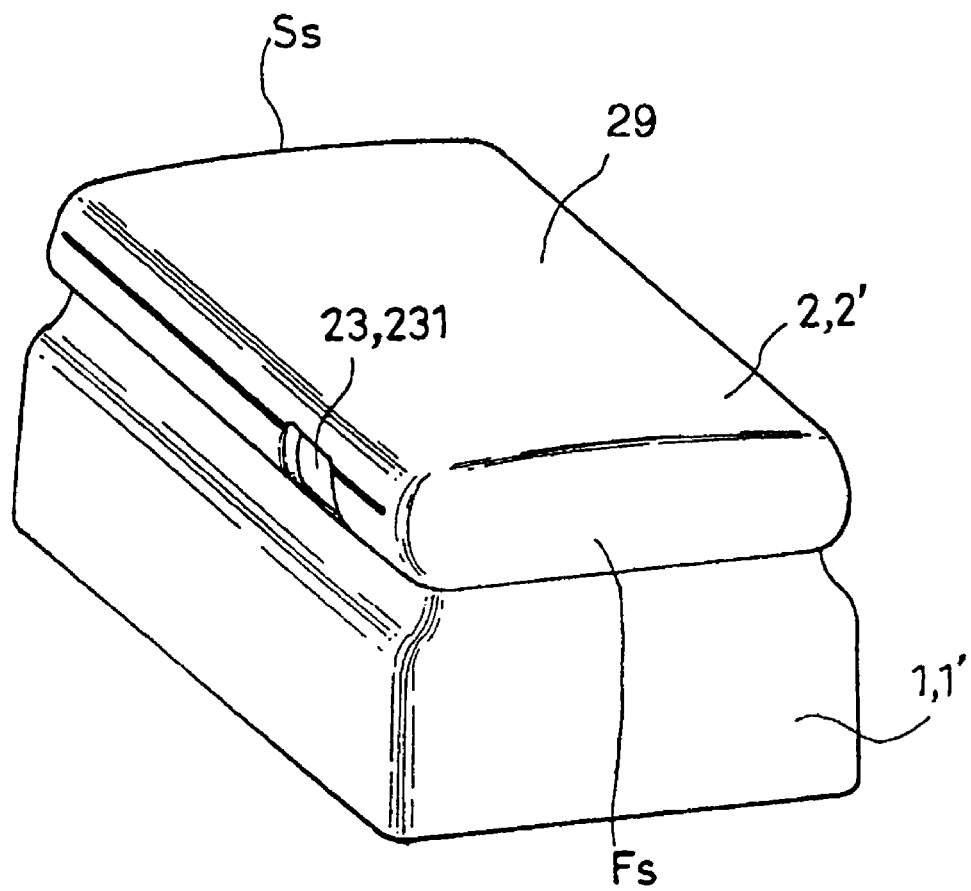
FIG. 1 is a perspective view of an example of the application of the lid device according to the present invention (in a closed position.
Figure 2:
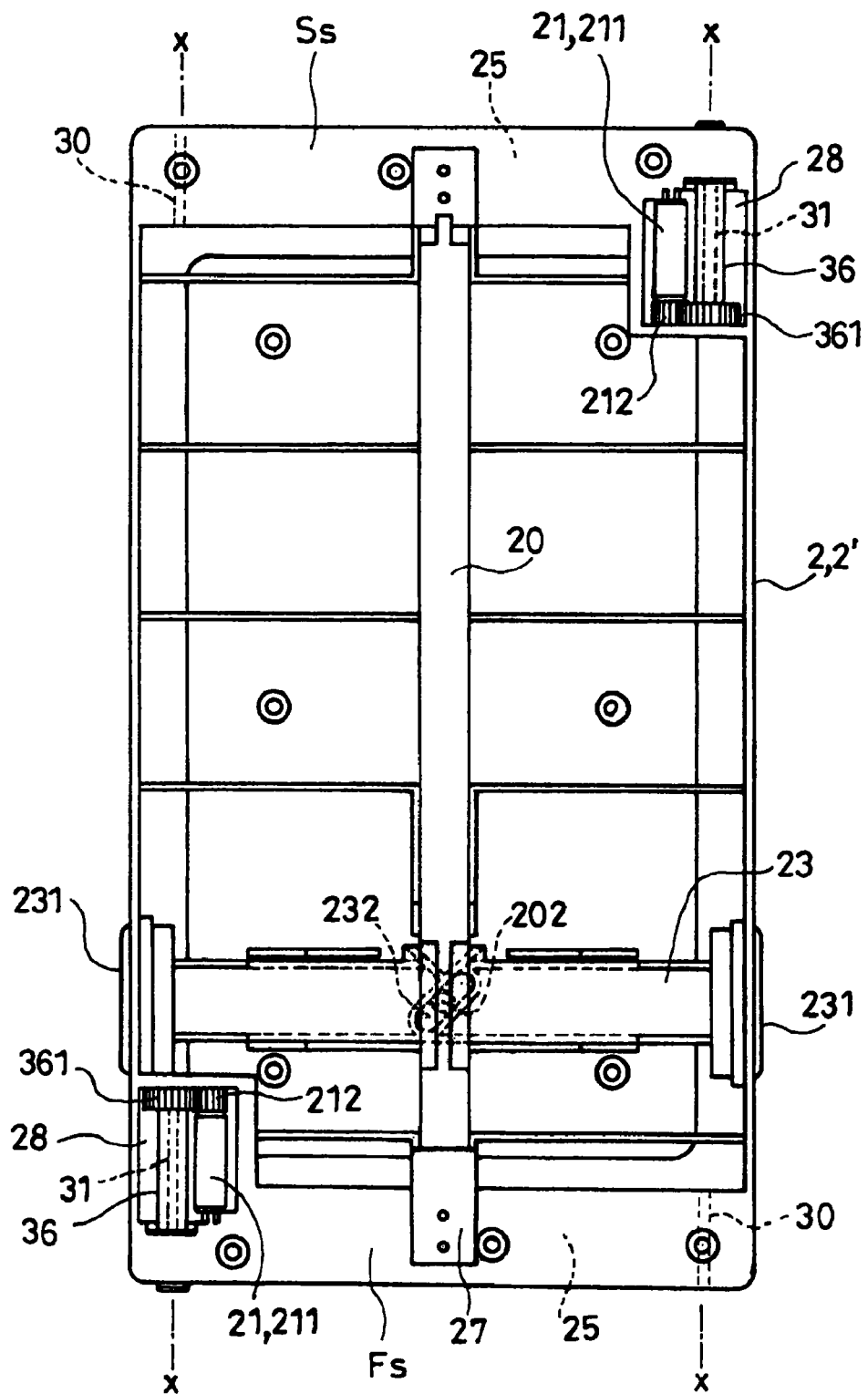
FIG. 2 is a plan view of essential parts of the example.
Figure 3:
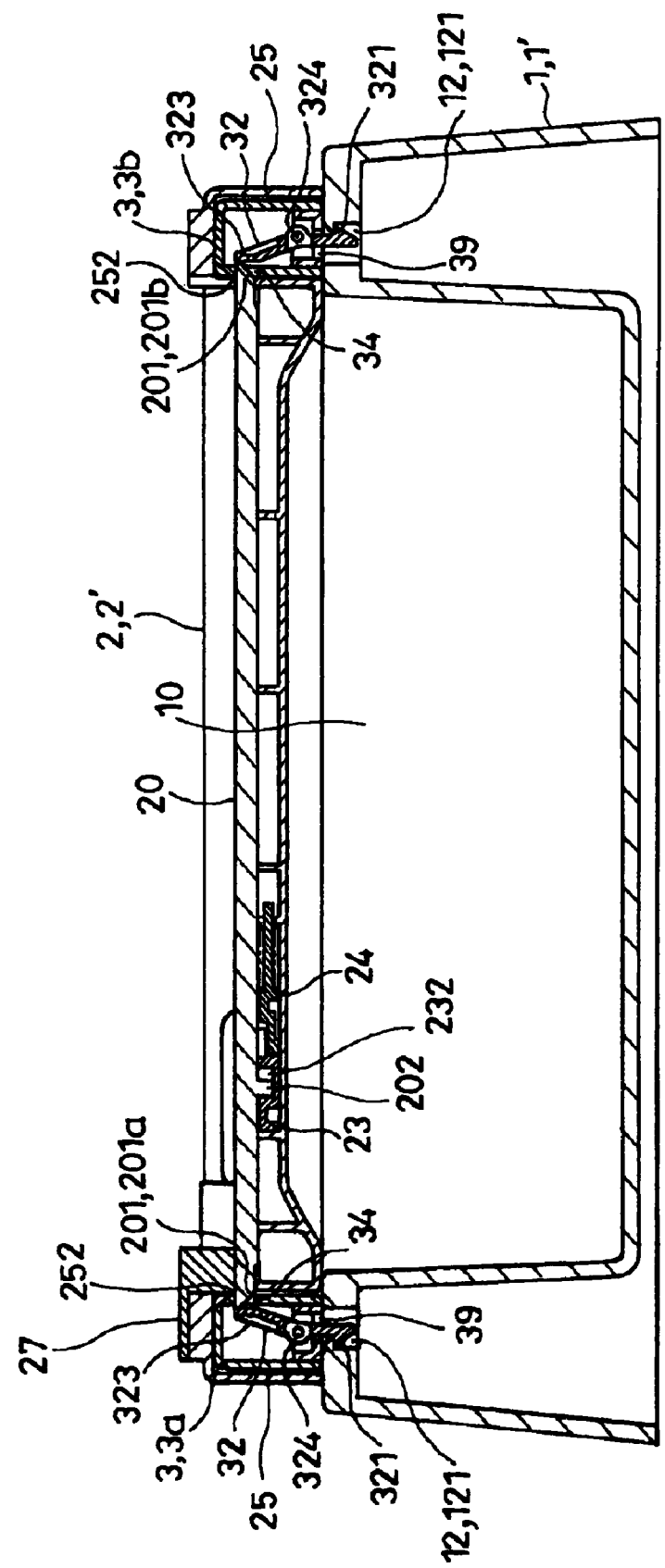
FIG. 3 is a vertical cross-sectional view of the example.
Figure 4:
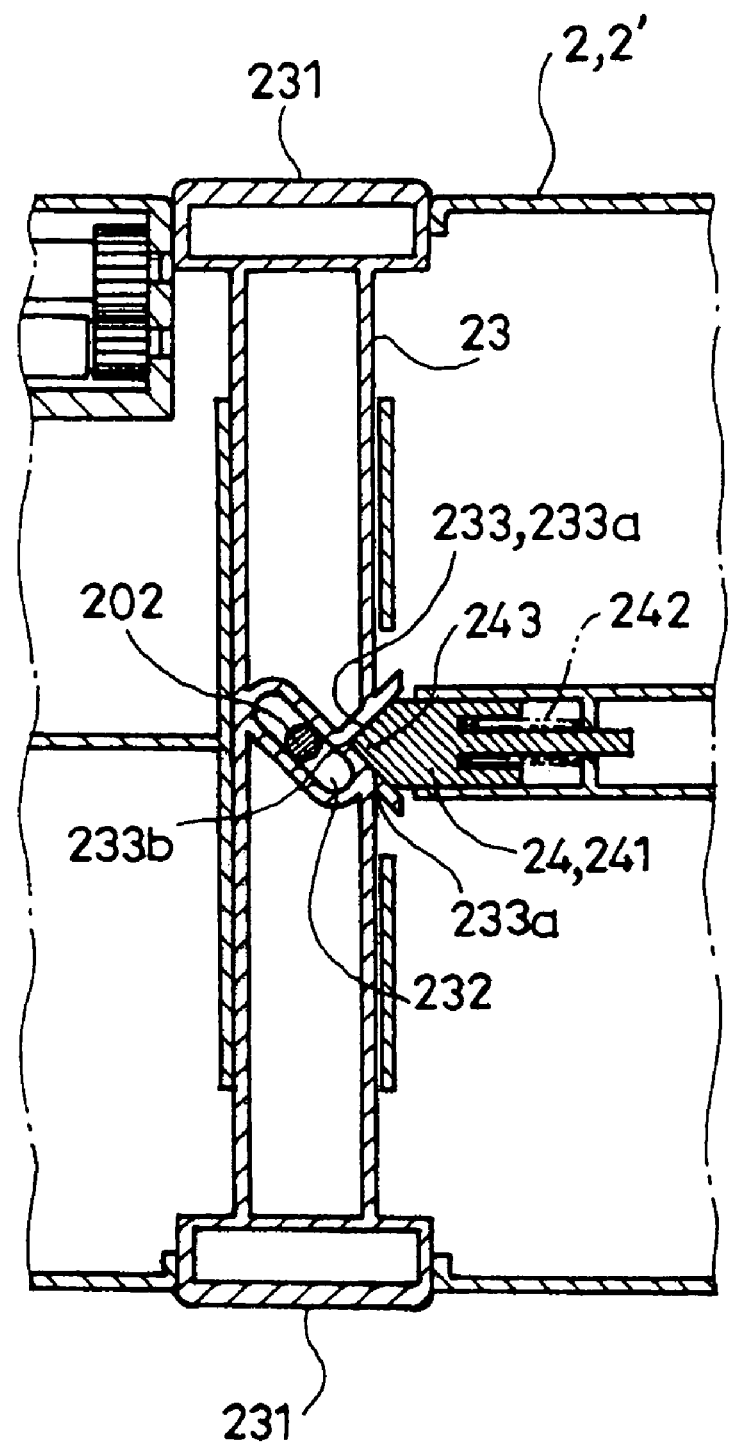
FIG. 4 is a horizontal cross-sectional view of essential parts of the example.
Figure 5:
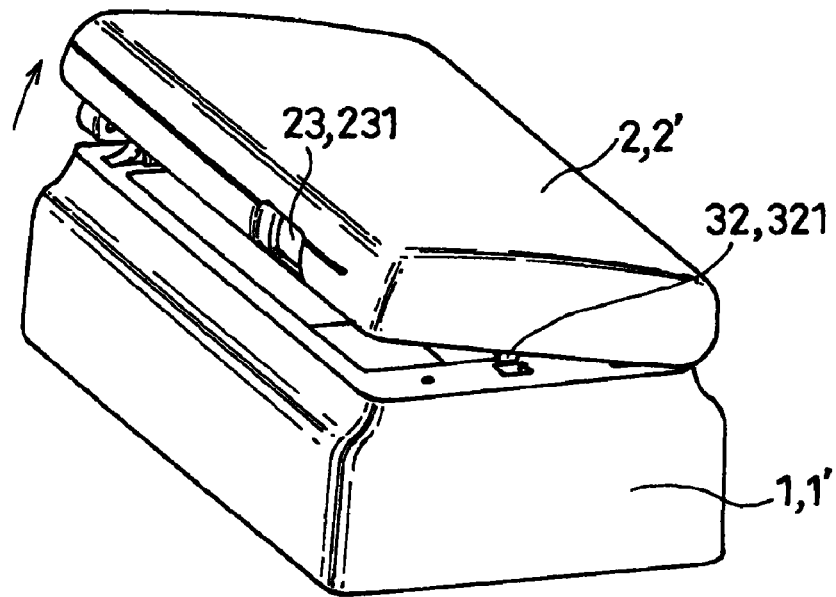
FIG. 5 is a perspective view of the example of the application of the lid device (in a state where an opening operation starts at one side)
Figure 6:
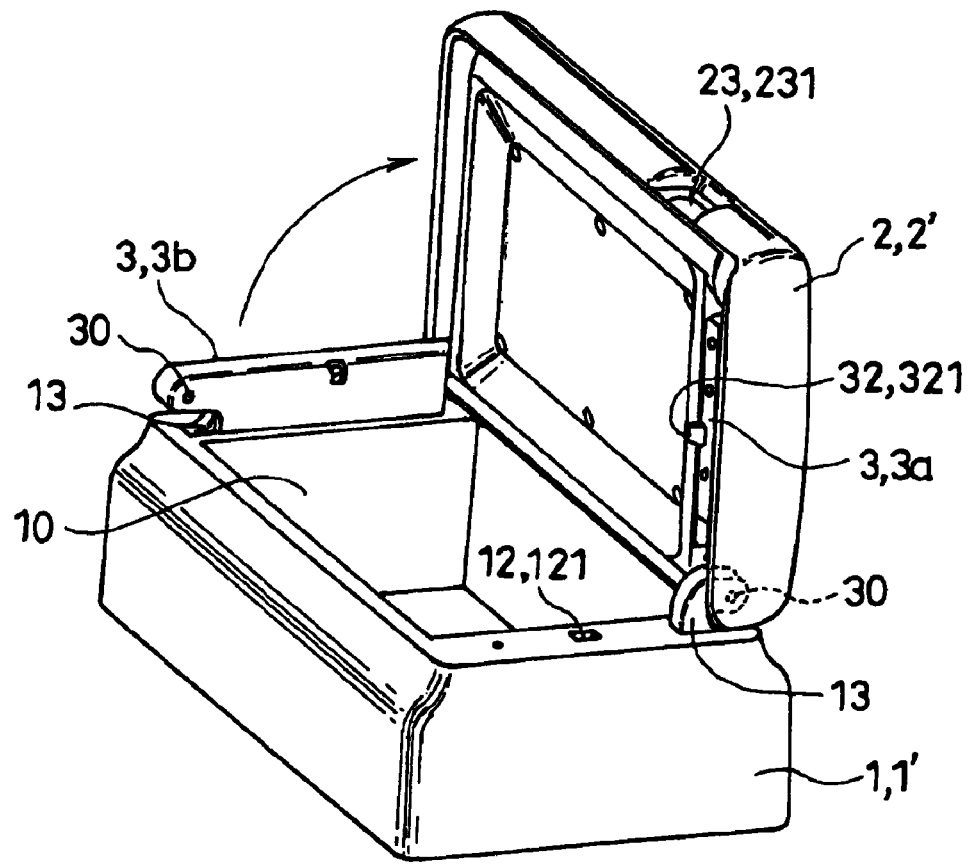
FIG. 6 is a perspective view of the example of the application of the lid device (in a state where the opening operation that has started at one side ends)
Figure 7:
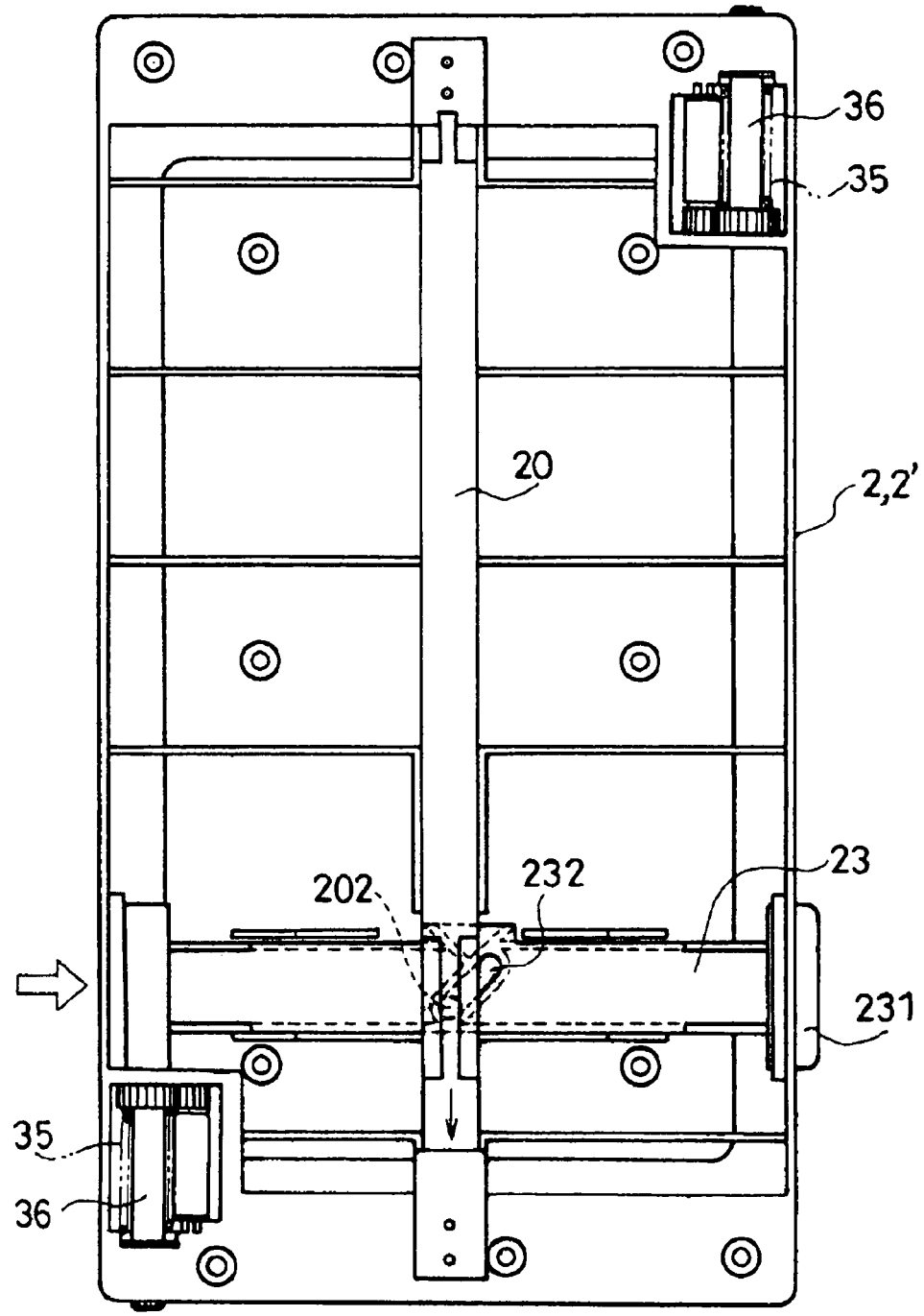
FIG. 7 is a plan view of essential parts just after the opening operation shown in FIG. 5 has started.
Figure 8:
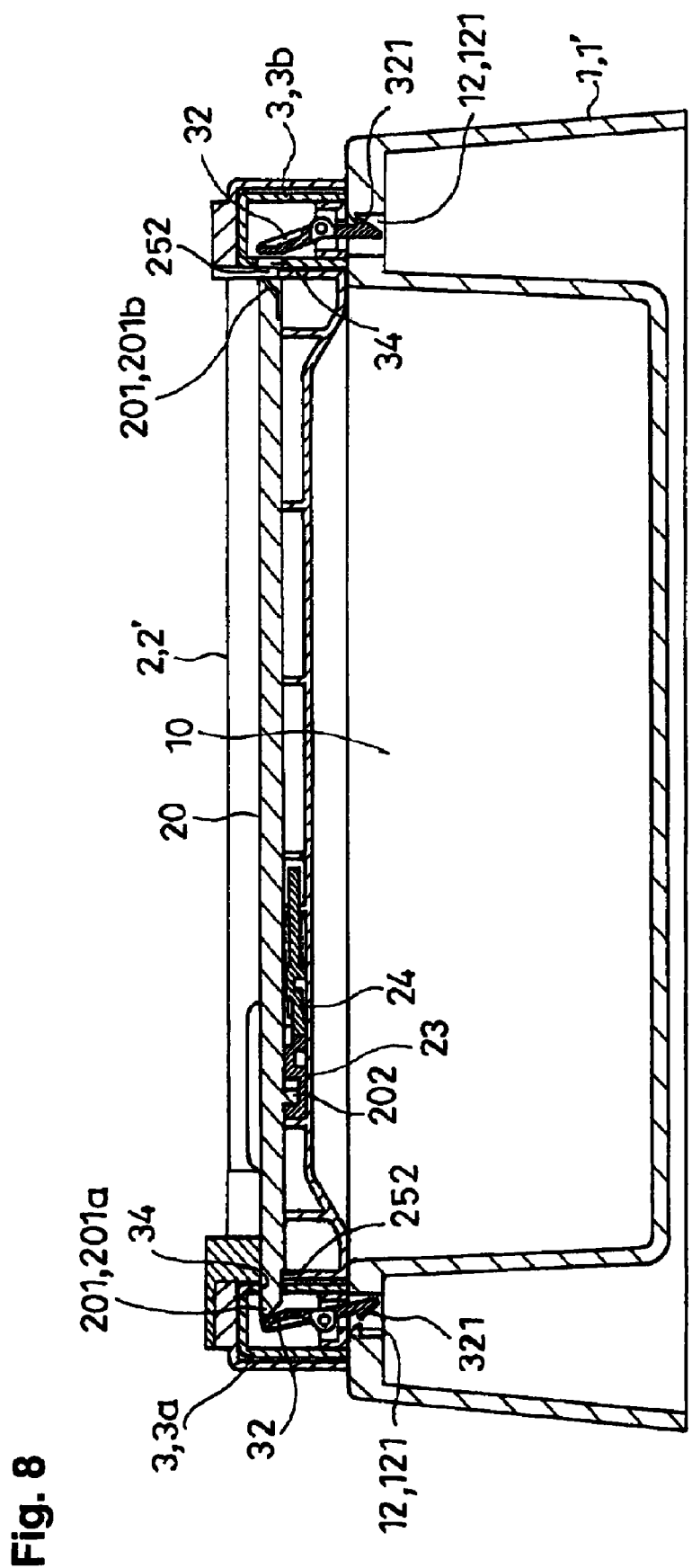
FIG. 8 is a vertical cross-sectional view of the example shown in FIG. 7.
Figure 9:
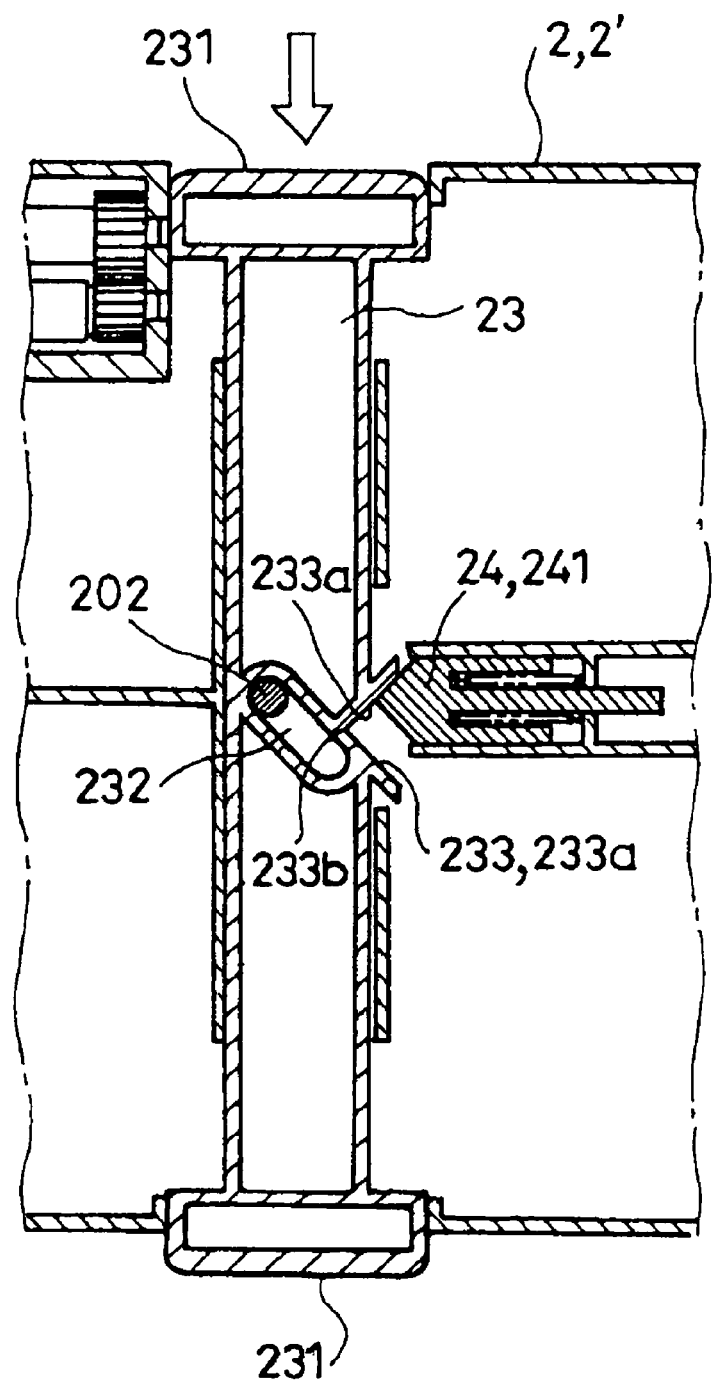
FIG. 9 is a horizontal cross-sectional view of the essential parts of the example shown in FIG. 7.
Figure 10:
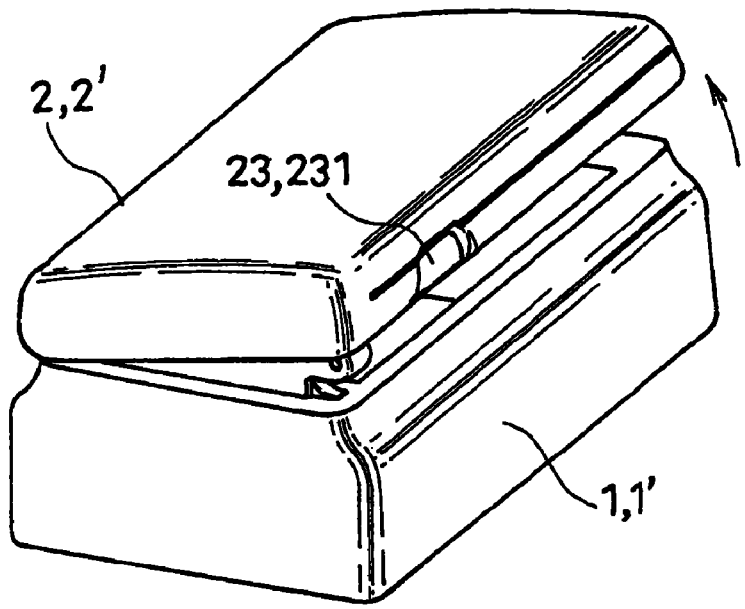
FIG. 10 is a perspective view of the example of the application of the lid device (in a state where an opening operation starts at the other side)
Figure 11:
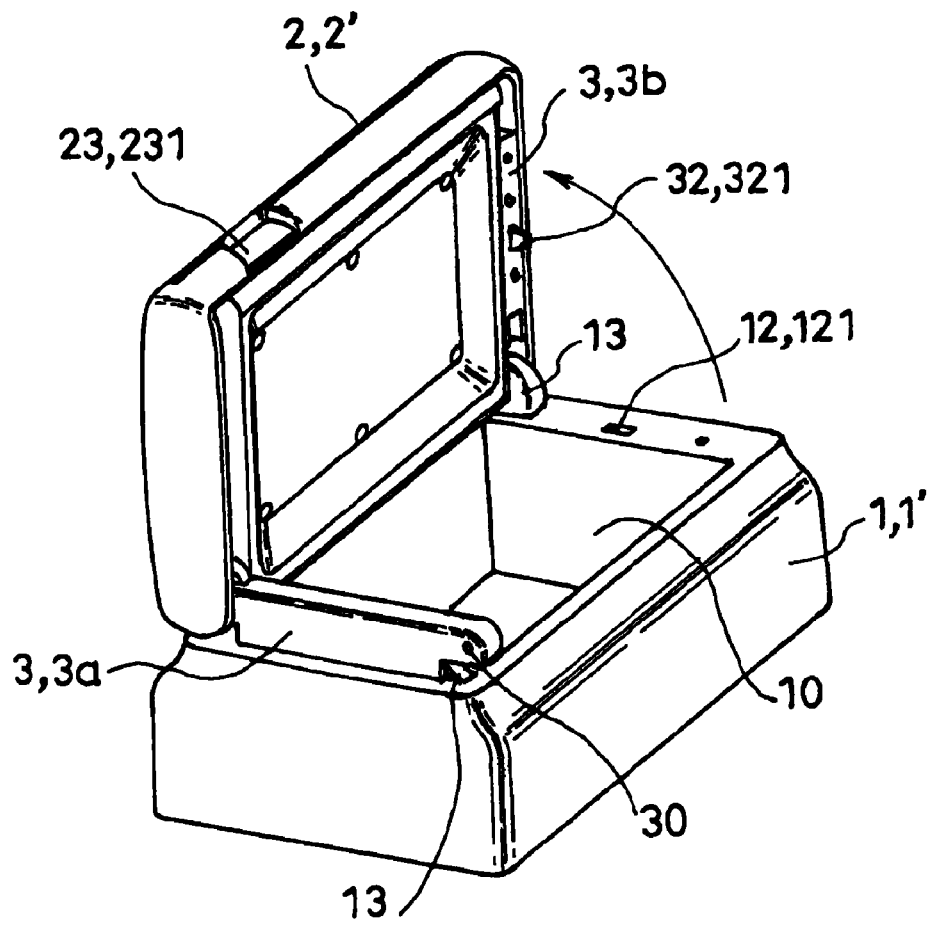
FIG. 11 is a perspective view of the example of the application of the lid device (in a state where the opening operation that has started at the other side ends)
Figure 12:
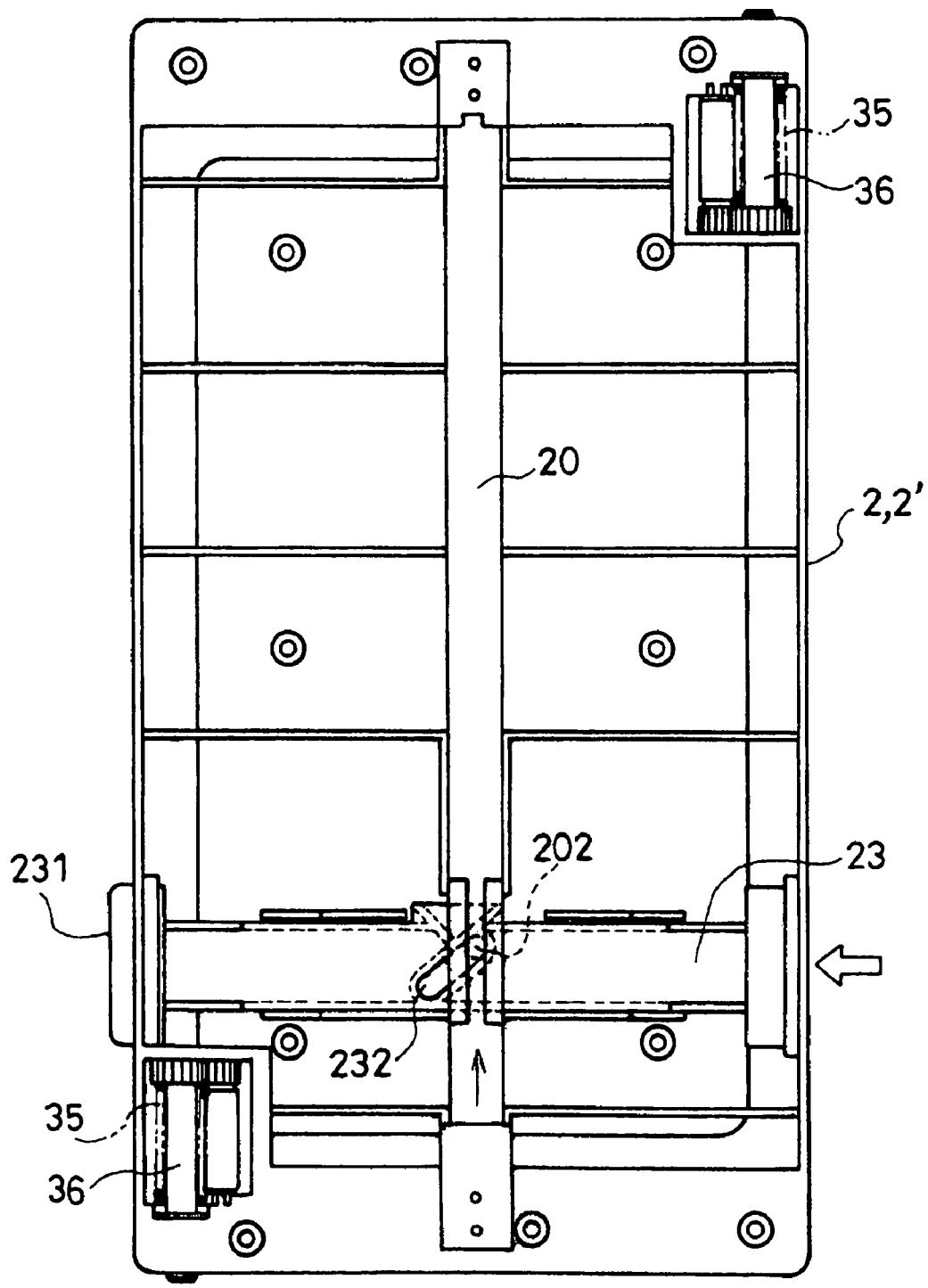
FIG. 12 is a plan view of the essential parts just after the opening operation shown in FIG. 10 has started.
Figure 13:
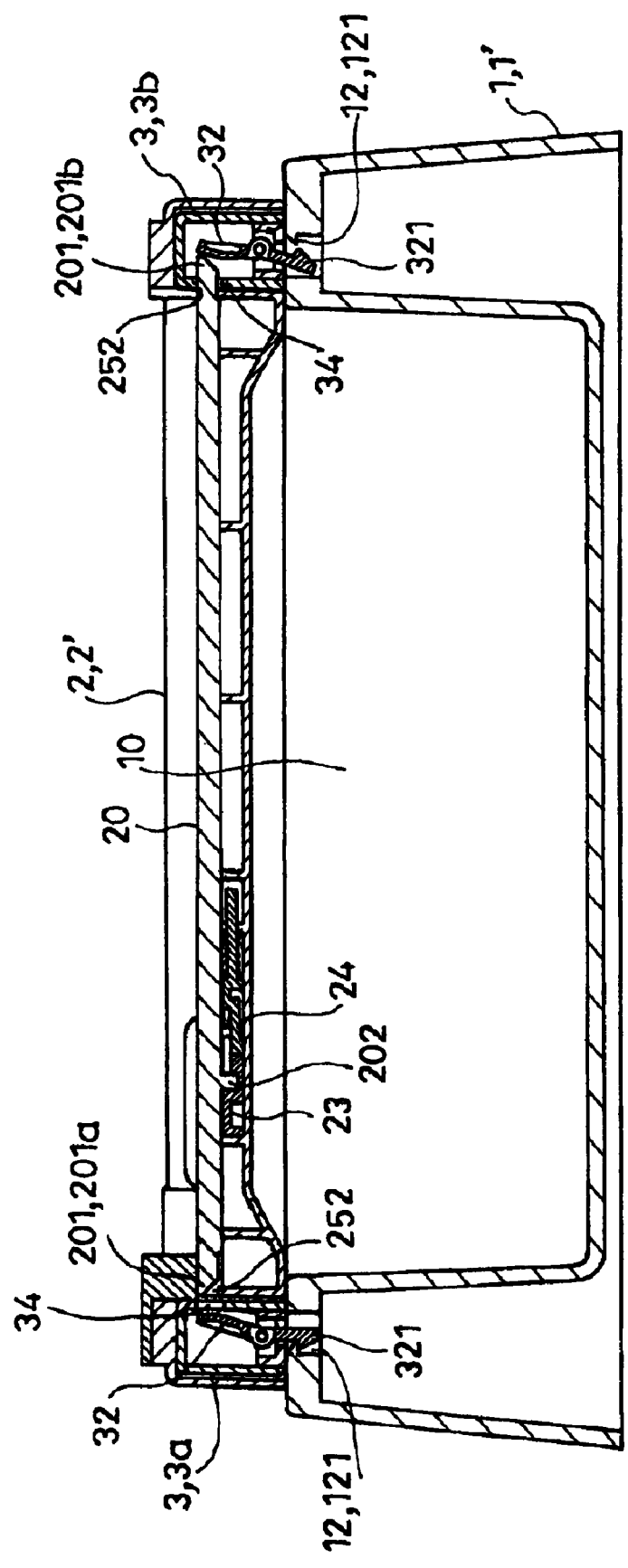
FIG. 13 is a vertical-cross-sectional view of the example shown in FIG. 12.
Figure 14:
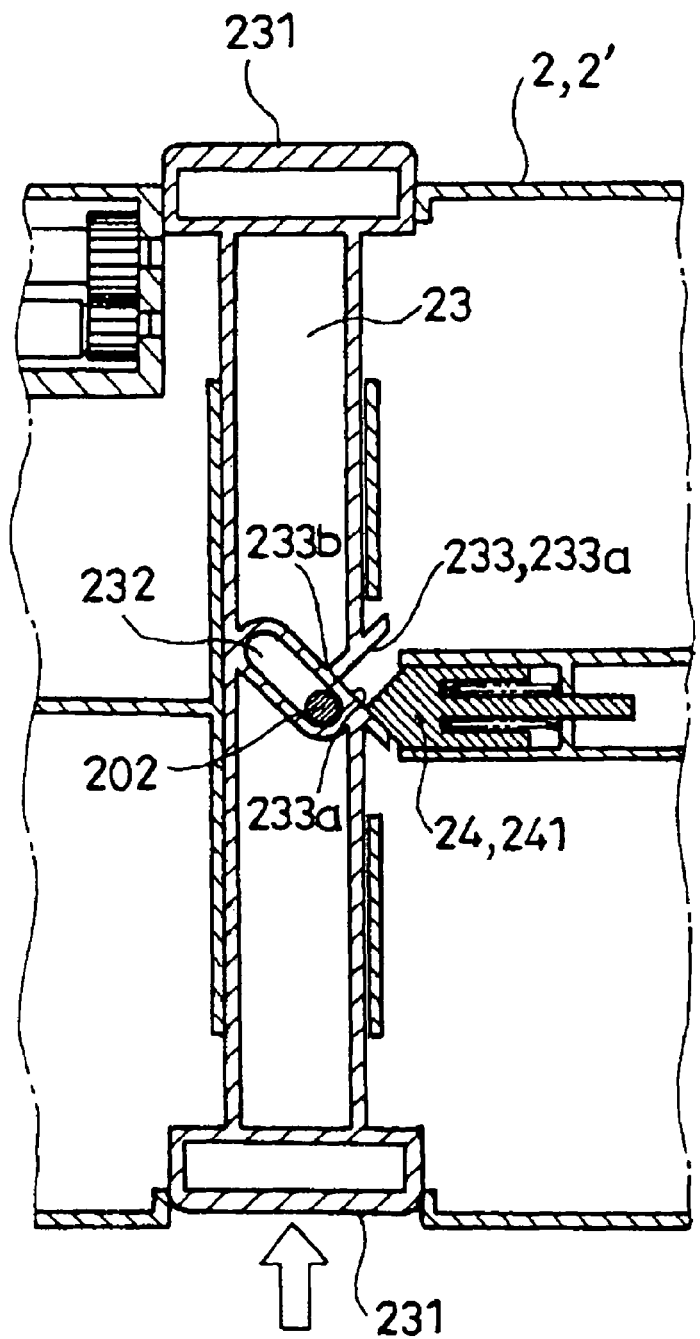
FIG. 14 is a horizontal cross-sectional view of the essential parts of the example shown in FIG. 12.
Figure 15:
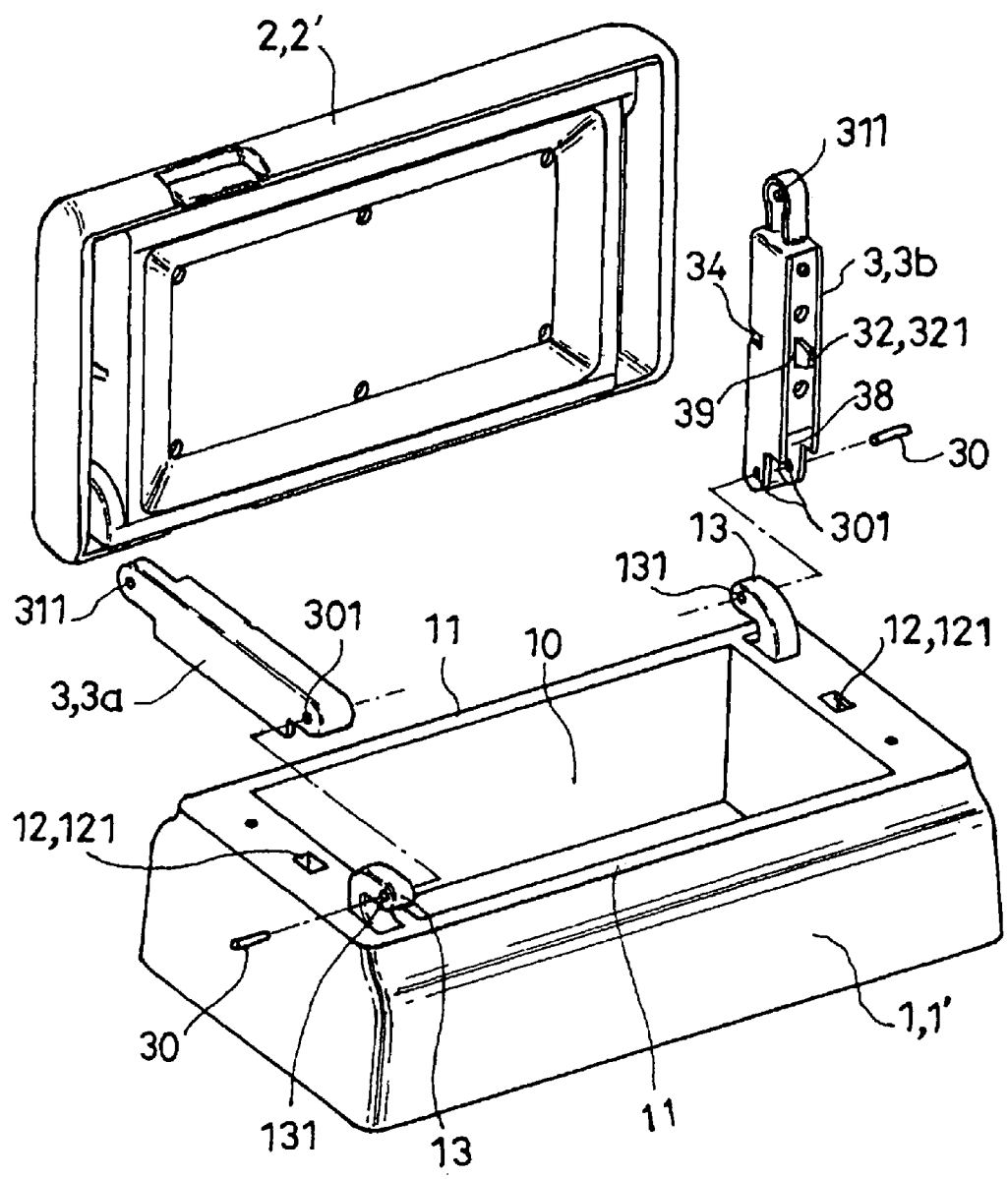
FIG. 15 is an exploded perspective view of an article having an opening formed therein, a linkage member and a lid member.
Figure 16:
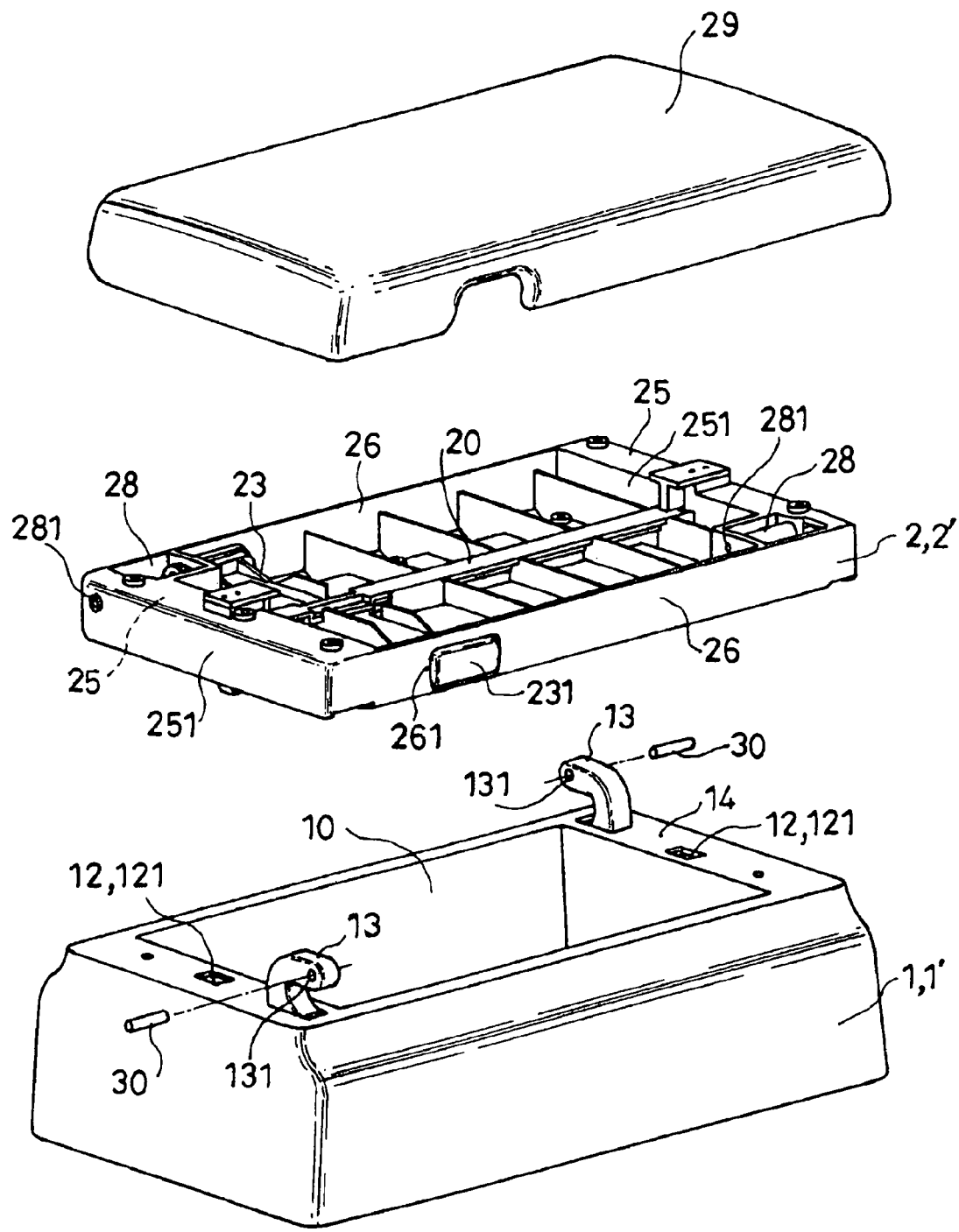
FIG. 16 is an exploded perspective view of the article having an opening formed therein, and the lid member.
Figure 17:
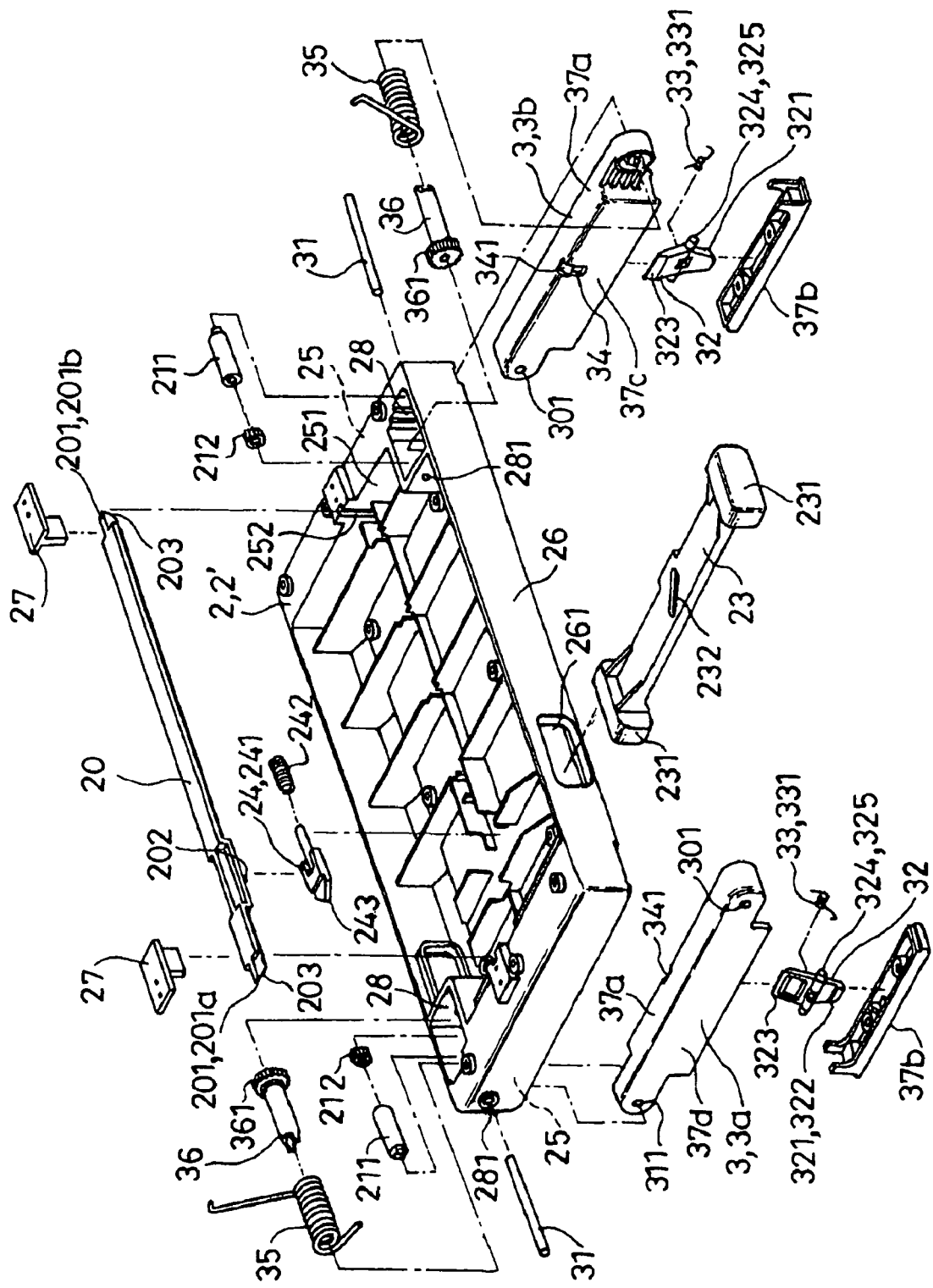
FIG. 17 is an exploded perspective view of the lid member.

FIG. 1 to FIG. 4 show a state where a lid member 2 of a lid device according to the present invention has closed an opening 10 of an article 1 having the opening formed therein, FIG. 5 to FIG. 9 show a state where the lid member 2 of the lid device is opened from one of opposite edges 11 of the opening 10, FIG. 10 to FIG. 14 show a state where the lid member 2 of the lid device is opened from the other edge 11 of the opening 10, and FIG. 15 to FIG. 17 show respective parts forming the lid device in a disassembled state. In particular, FIGS. 2, 7 and 12 are views showing the lid member 2, which is seen from above with an outer cover 29 forming the lid member 2 being removed, FIGS. 3, 8 and 13 are vertical cross-sectional views showing the lid device with the outer cover being removed therefrom, and FIGS. 4, 9 and 14 are transverse cross-sectional views of essential parts, from which the relationship between a control member 23 of a switching member 20 and a return system 24 is readily understood. When the control member 23 is operated from a state shown in FIG. 2 to a state shown in FIG. 7, the lid member 2 is opened, being erected and swung in the order of the states shown in FIG. 5 and FIG. 6. On the other hand, when the control member 23 is operated from a state shown in FIG. 2 to a state shown in FIG. 12, the lid member 2 is opened, being erected and swung in the order of the states shown in FIG. 10 and FIG. 11.

The lid device openable from both sides according to an embodiment of the present invention is configured to swing and open the lid member 2 so as to pivot the lid member about either one of the opposite edges 11 and 11 of the opening 10 in the article 1 having the opening formed therein, the lid member serving to close the opening.

The present invention is applicable as long as the article 1 has an opening that is closed so as to be openable by the lid member 2. Typical examples of the article 1 include a console box disposed in a vehicle, such as an automobile or an airplane, a piece of furniture with a storage compartment, or a cabinet for, e.g. a home electric appliance.

For a specific example, when the article 1 is formed of a box 1' serving as a center console box in an automobile and having an opening 10 formed in an upper side thereof, the lid member 2 according to the present invention is applicable to a lid 2' for the box. The lid 2' closes the opening 10 of the box 1' when being set in a substantially horizontal position. By applying the present invention to the lid, it is possible not only to erect and swing the lid 2' from a front passenger's seat so as to pivot the lid about an edge 11 of the opening 10 close to a driver's seat but also to erect and swing the lid 2' from the driver's seat so as to pivot the lid about an edge 11 of the opening 10 close to the front passenger's seat. Or, by applying the present invention to the lid, it is possible not only to erect and swing the lid 2' from a rear seat so as to pivot the lid about an edge 11 of the opening 10 close to a front seat but also to erect and swing the lid 2' from the front seat so as to pivot the lid about an edge 11 of the opening 10 close to the rear seat. In the case of the shown embodiment described later, the center console box 1' in the former case is configured to dispose imaginary straight lines x so as to extend in a front-to-rear direction of the automobile, the imaginary straight lines passing through a first shaft 30 and a second shaft 31 as described later. The center console box 1' in the latter case is configured to dispose the imaginary straight lines x so as to extend in a right-to-left direction of the automobile, the imaginary straight lines passing through the first shaft 30 and the second shaft 31. (See FIGS. 1, 5 and 10, and FIGS. 6 and 10.)

The lid device according to the present invention includes the lid member 2 and a linkage member 3.

The linkage member 3 has one end pivotally supported, through the first shaft 30, by the article 1 having the opening 10 closable by the lid member 2, and the other end supported, through the second shaft 31 parallel with the first shaft 30, by the lid member 2. The linkage member 3 includes a latch 32 engageable with a latch receiver 12 disposed in the article 1 and further includes a biasing member 33 for biasing the latch 32 so as to constantly set a latch end 321 in a position to be engageable with the latch receiver 12.

On the other hand, the lid member 2 has an engageable end 201 disposed therein so as to be receivable into an engagement hole 34 formed in a portion of the linkage member 3 between opposite ends of the linkage member, and further has the switching member 20 disposed therein so as to be movable to selectively set the engageable end 201 in an advanced position to place the engageable end in a most deepest position in the linkage member through the engagement hole 34, in a retracted position to take the engageable end out of the engagement hole 34, and in an intermediate position between both of the advanced position and the retract position.

When the engageable end 201 of the switching member 20 is set in the advanced position, the engageable end 201 causes the latch 32 to be pressed in a direction against the biasing action to be brought out of engagement with the latch receiver 12. In that time, the lid member 2 is coupled with the linkage member 3 at two locations of the second shaft 31 and the engageable end 201 of the switching member 20 while the article is coupled with the linkage member only by the first shaft 30. Thus, it is possible to swing and open the lid member 2 about the first shaft 30 without bringing the lid member 2 out of engagement with the linkage member 3 in that time (hereinbelow, referred to as the first shaft side swinging state).

When the engageable end 201 of the switching member 20 is set in the intermediate position, the engageable end 201 is brought into engagement with the engagement hole 34 of the linkage member 3 without bringing the latch 32 out of engagement with the latch receiver 12. In that time, the lid member 2 is coupled with the linkage member 3 at two locations of the second shaft 31 and the engageable end 201 of the switching member 20 while the article 1 is coupled with the linkage member 3 at two locations of the first shaft 30 and a combination of the latch 32 and the latch receiver 12. Thus, it is not possible to swing and open the lid member 2 about the first shaft 30 or the second shaft 31, with the result that the lid member 2 is kept closed in that time (hereinbelow, referred to as the unswingable state).

When the engageable end 201 of the switching member 20 is set in the retracted position, the engageable end 201 is brought out of engagement with the engagement hole 34 of the linkage member 3 with the latch 32 being brought into engagement with the latch receiver 12. In that time, the lid member 2 is coupled with the linkage member 3 only by the second shaft 31 while the article 1 is coupled with the linkage member 3 at two locations of the first shaft 30 and a combination of the latch 32 and the latch receiver 12. Thus, it is possible to swing and open the lid member 2 about the second shaft 31 without bringing the linkage member 3 and the article 1 out of engagement in that time (hereinbelow, referred to as the second shaft side swingable state).

The lid member 2 that is closed from an opened state is stably set to keep the opening 10 closed by bringing the latch 32 in engagement with the latch receiver 12 of the article 1 in the first shaft side swingable state and by bringing the engageable end 201 of the switching member 20 into engagement with the engagement hole 34 of the linkage member 3 left on the article in the second shaft side swingable state.

The relationship described above will be readily explained by using symbols. (It should be noted that in the following explanation, a symbol of "+" means that parts before and after the symbol are coupled together and united at two locations, and a symbol of "/" means that parts before and after the symbol are coupled together only at one location.)

First shaft side swingable state: (lid member 2)+(linkage member 3)/(article 1)

Unswingable state: (lid member 2)+(linkage member 3)+(article 1)

Second shaft side swingable state: (lid member 2)/(linkage members 3)+(article 1)

In the first shaft side swingable state, since the linkage member 3 has the one end formed with the first shaft 30 and the other end formed with the second shaft 31, the lid member 2 starts to be opened so that a side of the lid member 2 with the second shaft 31 disposed therein serving as a free end. On the other hand, in the second shaft side swingable state, the lid member 2 starts to be opened so that a side of the lid member 2 with the first shaft 30 disposed therein serving as a free end. In other words, the lid member 2 is openable from either one of both sides.

It should be noted that the lid member 2 is configured to be supported at both opposite sides thereof in the embodiment. In other words, the linkage member 3 is formed of a first linkage member 3a and a second linkage member 3b, and the lid member 2 is assembled to the article 1 through the two linkage members 3a and 3b. In the shown embodiment, the first linkage member 3a is disposed on a position close to one of the edges of the opening 10 in a width side of the opening, and the second linkage member 3b is disposed on a position close to the other edge of the opening 10 in the other width side of the opening, the opening having a substantially rectangular outline.

The lid member 2 is assembled, through the first linkage member 3a, to the article on a first end Fs of the lid member 2 (an end portion of the lid member 2 close to the one edge of the opening in the width side in the shown embodiment), and the lid member 2 is also assembled, through the second linkage member 3b, to the article on a second end Ss of the lid member 2 (an end portion of the lid member 2 close to the other edge of the opening in the width side in the shown embodiment).

The second linkage member 3b has a second shaft 31 substantially positioned on an imaginary straight line x passing through a first shaft 30 of the first linkage is member 3a, and the second linkage member 3b has a first shaft 30 substantially positioned on an imaginary straight line x passing through a second shaft 31 of the first linkage member 3a.

The switching member 20 is configured to include a first engageable end 201a for the first linkage member 3a and a second engageable end 201b for the second linkage member 3b, and the switching member is configured so that when the first engageable end 201a of the switching member 20 is moved to the advanced position, the second engageable end 201b is moved to the retracted position and that when the second engageable end 201b of the switching member 20 is moved to the advanced position, the first engageable end 201a is moved to the retracted position.

When the first engageable end 201a of the switching member 20 is moved to the advanced position, the first end Fs of the lid member 2 is set in the first shaft side swingable state while the second end Ss of the lid member 2 is set in the second shaft side swingable state. In this situation, since the second shaft 31 of the second linkage member 3b is substantially positioned on the imaginary straight line x passing through the first shaft 30 of the first linkage member 3a (see FIG. 6), it is possible to swing and open the lid member 2.

When the second engageable end 201b of the switching member 20 is moved to the advanced position, the second end Ss of the lid member 2 is set in the first shaft side swingable state while the first end Fs of the lid member 2 is set in the second shaft side swingable state. In this situation, since the first shaft 30 of the second linkage member 3b is substantially positioned on the imaginary straight line x passing through the second shaft 31 of the first linkage member 3a (see FIG. 11), it is possible to swing and open the lid member 2 in such a way that an end of the lid member, which is opposite to the end of the lid member serving as a free end in the former case, serves as a free end.

When both of the first engageable end 201a and the second engageable end 201b of the switching member 20 are not in the advanced position, both of the first engageable end 201a and the second engageable end 201b are in the intermediate position. In that time, the lid member 2 keeps the opening 10 of the article 1 closed since the lid member 2 is not swingable on both of the first end Fs and the second end Ss (see FIG. 1).

When the lid member 2 is configured to be supported at both opposite sides thereof as described above, the lid member 2 is swung and opened in a stable manner in particular.

In the embodiment, the lid member 2 is constantly biased in directions to be swung and opened about the respective second shafts 31 by torsion coil springs 35 disposed around the second shaft 31 of the first linkage member 3a and the second shaft 31 of the second linkage member 3b. (It should be noted that the coil springs 35 are omitted in FIG. 2.)

By this arrangement, it is possible to swing and open the lid member 2 by the biasing action of a spring 35 in the embodiment.

In particular, irrespective of whether the lid member 2 is opened from either one of the opposite sides in the embodiment, the lid member 2 is caused to be swung and opened by the biasing action of the relevant spring 35.

In the embodiment, laterally of each of the second shafts 31 is provided a damper 21, which has a pinion 212 brought into engagement with a gear 361 disposed in a link member 3 swingable about the second shaft 31 and applies a braking force to the pinion 212.

This arrangement allows the lid member 2 to be swung and opened in a slow manner, providing sophistication to the lid device, or an article with the lid device applied thereto, such as an appliance or furniture in the embodiment.

In the embodiment, the switching member 20 is configured to be movable in a direction along the imaginary straight lines x and includes the control member 23 of the switching member 20, which is disposed in the lid member 2 so as to be movable in both directions perpendicular to the imaginary straight lines x. When the control member 23 is set in a reference position, both of the first engageable end 201a and the second engageable end 201b of the switching member 20 are set in the intermediate position. The lid member 2 includes the return system 24, which pushes the control member 23 back to the reference position when the control member 23 has been moved from the reference position.

More specifically, the control member 23 is interlocked with the switching member 20 so that when the control member 23 is moved from the reference position to one side, the first engageable end 201a of the switching member 20 is shifted to the advanced position, while when the control member 23 is moved from the reference position to the other side, the second engageable end 201b of the switching member 20 is shifted to the advanced position.

Thus, by depressing the control member 23 on a side of the lid member 2 where the opening operation is performed, it is possible to open the lid member with this side serving as a free end in the embodiment. Since the control member 23 is returned to the reference position by the return system 24 after the lid member 2 starts to be opened by depressing the control member 23 in this way, both of the first engageable end 201a and the second engageable end 201b of the switching member 20 are returned to the intermediate position. After the switching member 20 is once moved in a direction against the pushing action of the return system 24 when the lid member 2 is set from an opened state into the closed state, the first engageable end 201a and the second engageable end 201b are brought into engagement with the engagement holes 34 in the first linkage member 3a and the second linkage member 3b to stably keep the lid member 2 closed.

When the control member 23 is moved from the reference position to the one side, the first engageable end 201a of the switching member 20 is shifted to the advanced position, and the second engageable end 201b of the switching member 20 is shifted to the retracted position, with the result that the lid member 2 is allowed to be swung and opened. When the control member 23 is moved from the reference position to the other side, the first engageable end 201b of the switching member 20 is shifted to the advanced position, and the second engageable end 201a of the switching member 20 is shifted to the retracted position, with the result that the lid member 2 is allowed to be swung and opened in such a way that an end of the lid member, which is opposite to the end of the lid member serving as a free end in the former case, serves as a free end.

In particular, in the shown embodiment, the lid member 2 starts to be opened by the biasing action of a relevant one of the springs, and when the control member 23 is released from a depressing operation, the return system 24 returns the control member 23 to the reference position to set both of the first engageable end 201a and the second engageable end 201b of the switching member 20 in the intermediate position. As long as the lid member 2 is opened, one of the first engageable end 201a and the second engageable end 201b is brought into engagement with the linkage member 3. When the lid member 2 is closed, the other one of the first engageable end 201a and the second engageable end 201b in the intermediated position brings the relevant latch 32 into engagement with the relevant latch hole 12, collides against an outer side of a linkage member 3 left on the article 1 in the vicinity of the engagement hole 34 of the linkage member 3, and is once moved to the retracted position against the pushing action of the return system 24. (In that time, the one of the first engageable end 201a and the second engageable end 201b is moved to the advanced position.) After that, the other one of the first engageable end 201a and the second engageable end 201b is pushed back by the return system and is returned to the intermediate position again to be brought into engagement with the engagement hole 34. Thus, the lid member 2 can stably keep the opening 10 closed again.

In the shown embodiment, the opening 10 of the article 1 is configured to have a substantially rectangular outline having a width and a length, and the lid member 2 is also configured to form a substantially parallelepiped board having a width and a length. In the figures, reference numeral 29 designates the outer cover of the lid member 2.

The lid member 2 has recessed portions 25 for housing the linkage members 3, formed on both sides in a length direction thereof so as to extend throughout the width thereof and to be open at a lower side thereof.

The lid member 2 has an upper side closed by the outer cover 29 and rising walls 26 formed on edges along the longitudinal direction to extend between the recessed portions 25. The lid member 2 is formed as a box having an upper side opened, which is defined by lateral walls 251 forming the recessed portions 25, and inner sides of the rising walls 26. Each of the lateral walls of the recessed portions has a substantially central portion facing the inside of the lid member 2, formed with a slot 252 for an engageable end 201 of the switching member 20 passing through each of the lateral walls 251. In the figures, reference numeral 27 designates a retainer for the switching member 20 passing through each of the slots 252. (It should be noted that only the retainer 27 disposed on the first end Fs of the lid member 2 is shown in each of FIG. 2, FIG. 3, FIG. 7, FIG. 8, FIG. 12 and FIG. 13.)

The lid member 2 has two diagonally opposite corners of the four corners, formed with assembled recessed portions 28, each of which is opened on the upper side of the lid member 2 and is formed in a substantially parallelepiped shape. Portions of the outer and inner lateral walls 251 forming the recessed portions 25 in the two diagonally opposite corners, and lateral walls of the assembled recessed portions 28 have fixing holes 281 formed therein to pass the second shafts 31 therethrough. The second shafts 31 pass through the fixing holes 281 and are fixed to the lid member 2 so as to have their axes extending along the longitudinal direction of the lid member 2. In the shown embodiment, each of the linkage members 3 has a shaft hole 311 formed in a portion thereof close to one of the two diagonally opposite corners, the shaft hole being placed in alignment with the fixing hole 281 in the relevant recessed portion 25. In the shown embodiment, each of the second shafts 31 is housed in a sleeve 36, which is disposed in each of the assembled recessed portions 28, and which has one end fixed to a peripheral portion of the shaft hole 311 of each of the linkage members 3. Each of the sleeves 36 has each of the torsion coil springs 35 disposed therearound. Each of the linkage members 3 is constantly biased in a direction to get out from each of the recessed portion of the lid member 2 by each of the torsion coil springs 35. In each of the assembled recessed portions 28, the damper 21 is housed so as to have the rotary shaft of the pinion 212 extending in parallel with the second shaft 31, the damper being formed of a cylindrical member 211 and the pinion 212 supported by the cylindrical member 211 on one end of the cylindrical member 211 so as to be rotatable about the axis of the cylindrical member 211. Each of the dampers 21 has a viscous fluid, such as silicone oil, sealed in each of the cylindrical member 211 so as to apply the resistance of the viscous fluid to a portion of the pinion 211 in each of the cylindrical member 211 during rotation of the pinion 212. Each of the sleeves 36 has the other end formed with each of the gears 361 constantly engageable with each of the pinions 212. Thus, the opening operation of the lid member 2 from either one of both sides is assisted by the relevant spring 35 while the opening operation of the lid member from either one of both sides is subjected to a proper braking force in the embodiment.

In the lid member 2, the control member 23 is disposed so as to be movable along the width direction of the lid member in a position closer to the first end Fs than an intermediate position in the longitudinal direction of the lid member, the control member having a length extending throughout the width direction of the lid member 2. The paired raising walls 26 have slots 261 formed therein to expose buttons 231, which are formed on both ends of the control member 23. The control member 23 is configured to be depressed from the reference position by depressing a button 231 through the relevant slot 261. The control member 23 has a cam groove 232 formed in a substantially central portion thereof in a longitudinal direction thereof so as to extend in a direction intersecting with the longitudinal direction. The control member 23 has a pressed portion 233 formed in a lower side thereof in a substantially intermediate position in the longitudinal direction, the pressed portion being formed of right and left diagonal faces 233a and 233a forming the same angle with the longitudinal direction of the control member 23 as each other and crossing at right angles in a central portion of the control member 23. The right and left diagonal faces 233a and 233a face toward the second end Ss of the lid member 2. In the lid member 2, a pressing member 241 as the return system 24, which is constantly pressed against the pressed portion 233 from a side close to the second end Ss of the lid member 2 by a spring 242, is disposed so as to be movable along the longitudinal direction of the lid 2. The pressing member 241 has a leading edge 243 formed in a shape similar to the inner shape of a rectangular equilateral triangle formed by the right and left diagonal faces 233a and 233a of the pressed portion 233. When the control member 23 is not subjected to a depressing operation, the control member 23 is located at a position to have the leading edge 243 of the pressing member 241 in a depth 233b where the right and left diagonal faces 233a and 233a of the pressed portion 233 are brought into contact with each other (see FIG. 2 showing the control member 23 at the reference position).

In the shown embodiment, the switching member 20 is formed as a bar, which has such a length that both ends of the switching member are constantly fitted into the slot 252 formed in one of the recessed portions 25 and the slot 252 formed in the other recessed portion 25. Both ends of the switching member serve as the above-mentioned engageable ends 201. The switching member 20 has a projection 202 formed thereon at a portion just above an upper side of the control member 23 so as to be housed in and be guided by the cam groove 232. When the control member 23 is set in the reference position, the projection 202 is located at a substantially intermediate position in the longitudinal direction of the cam groove 232 (see FIG. 2). When the control member 23 is depressed from the reference position toward a right side in FIG. 2, the switching member 20 is moved downward in this figure, with the result that an upper end portion 323, which forms a part of the latch 32 disposed in the lower linkage member 3 and is opposite to a latch end portion 321 of the latch with respect to a rotary shaft 324 of the latch, is pressed in a direction to be brought out of engagement with the relevant latch receiver 12 (see FIG. 7 and FIG. 8). When the control member 23 is depressed from the reference position toward a left side in FIG. 2, the switching member 20 is moved upward in this figure, with the result that an upper end portion 323, which forms a part of the latch 32 disposed in the upper linkage member 3 and is opposite to the latch end portion 321 of the latch, is pressed in a direction to be brought out of engagement with the relevant latch receiver 12 (see FIG. 12 and FIG. 13).

When the control member 23 is set in the reference position, both engageable ends 201 and 201 of the switching member 20 pass through the engagement holes 34 of the linkage members 3 so as to slightly protrude in the recessed portions 25 from the slots 252 (see FIG. 3). Each of the engageable ends 201 has a lower side formed with a slant face 203 (which is slant so as to gradually narrow each of the engageable ends 201 toward the distal end of each of the engageable ends 201.

Each of the linkage members 3 has the other end formed with the shaft hole 311 for the second shaft 31 and the one end formed with a shaft hole 301 for the first shaft 30 and is formed in a bar shape, which has a thickness that is completely housed in each of the recessed portions 25 when the lid member 2 is set in the closed position.

In the shown embodiment, each of the linkage members 3 is formed as a hollow member except for the other end, which is formed of an upper wall 37a, a lower wall 37b, an inner wall 37c (a lateral wall facing toward a counter linkage member 3) and an outer wall 37d, the upper wall and the lower wall being located at an upper position and a lower position, respectively, when the lid is closed, and the inner and outer walls extending between the upper and lower walls.

A portion of the lower wall 37b of each of the linkage members 3, which is close to the one end, is cut out so as to house a bracket 13 through the cutout portion 38, the bracket being disposed on a portion of the article 1 outside a corner lying on one of the two diagonal lines passing through the four corners of the opening 10, and each bracket protruding upward laterally from each edge of the opening in the width direction. Each of the brackets 13, and portions of the inner wall 37c and the outer wall 37d of each of the linkage members 3, which are close to the one end, have the relevant shaft hole 301 and a shaft hole 131 formed therein, respectively, for the first shafts 30. Each of the linkage members 3 is swingably assembled to the article 1 by passing each of the first shafts 30 through the shaft holes 301 and 131.

Each of the linkage members 3 has the relevant engagement hole 34 formed so as to pass therethrough in a portion of the inner wall 37c in a substantially intermediate position in the longitudinal direction thereof. Each of the engagement holes 34 has a slant guide surface 341 formed between the upper wall 37a and an upper hole edge thereof so as to gradually rise toward the upper wall 37a. When the lid member 2, which has set in an opened state, is subjected to a closing operation, the engageable end 201 of the switching member 20 disengaged from a linkage member 3 is slightly retracted with the slant face 203 of the engageable end 201 sliding on the slant guide surface 341 since the engageable end 201 is located in the intermediate position by the control member 23 set in the reference position. Thus, the lid member 2 is allowed to move to the closed position. When the lid member 2 is set in the closed position, the engageable ends 201 of the switching member 20 are brought into engagement in the engagement holes of the linkage members 3 because of being returned to the intermediate positions and being put into the engagement holes 34 by the push-back operation of the return system 24.

In the shown embodiment, each of the latch receivers 12 is formed of a through hole 121, which is formed in an upper portion 14 forming the article 1, and which is formed in a portion of the article 1 close to the opening in a substantially intermediate position of each of the edges on the width sides of the opening 10.

On the other hand, each of the latches 32 has the latch end 321 and the upper edge 323 formed therein, the latch end 321 protruding from a slot 39 formed in the lower wall 37b of the relevant linkage member 3 in a substantially intermediate position in the longitudinal direction of the relevant linkage member 3 so as to pass through the lower wall, and the relevant upper edge being located in front of the relevant engagement hole 34 in each of the linkage members 3. Each of the latches is swingably supported by each of the linkage member 3 so as to extend the relevant rotary shaft 324 along the longitudinal direction of the relevant linkage member 3 by utilizing shaft projections 325 formed in both lateral sides between the latch end 321 and the upper edge 323 of each of the latches. Each of the latch ends 321 is formed of a pawl 322 projecting toward the outer wall of the relevant linkage member 3. One of the shaft projections 325 has a torsion coil spring 331 disposed around one end thereof so that the relevant latch 32 is located at a position to put the relevant latch end 321 into the relevant through hole 121 as one of the latch receivers 12 to bring the pawl 322 into engagement with the edge of the through hole 121 when the lid member 2 is set in the closed position. When one of the engageable end 201 of the switching member 20 is moved to the advanced position with the lid member 2 being set in the closed position, the one engageable end 201 presses the upper edge 323 of the relevant latch 32 from a side close to the inner wall 37c of the relevant linkage member 3, with the result that the latch 32 is swung in a direction to bring the latch end 312 out of engagement with the relevant through hole 121 as one of the latch receivers 12. Thus, the lid member 2 is opened about the first shaft 30 close to the one engageable end with the relevant linkage member 3 being housed in the relevant recessed portion 25 of the lid member 2. (The linkage member 3 opposite to the relevant linkage member 3 is left on the article 1, keeping the latch 32 thereof in engagement with the latch receiver 12 thereof.) When the operation of the switching member 20, i.e. the depressing operation of the control member 23 is stopped, the one engageable end 201 returns to the intermediate position, with the result that the latch end 312 of the latch 32 of the linkage member 3 rising along with the lid member 2 is returned to the original position by the relevant spring 331. When the lid member is subjected to a closing operation, the latch end 312 is hit against the edge of the through hole 121 as one of the latch receivers 12, is slightly swung against the action of the spring 331, gets into the through hole 121 and returns to the original position, being brought into engagement with the through hole 121 as described above.

The entire disclosure of Japanese Patent Application No. 2006-069875 filed on Mar. 14, 2006 including specification, claims, drawings and summary is incorporated herein by reference in its entirety.

The invention claimed is:

1. A lid device openable from two sides on an article with an opening, comprising:
   a lid member having a right side and a left side,
   first and second linkage members separated from the lid member and arranged along the right and left sides of the lid member, respectively, each linkage member having a first shaft arranged between one end of the linkage member and the article and a second shaft arranged between the other end of the linkage member and the lid member, the first and second shafts of the first linkage member being arranged coaxially with the second and first shafts of the second linkage member, respectively, each linkage member having in a middle portion thereof a latch projecting outwardly therefrom and a biasing member for biasing the latch in one direction,
   a latch receiver disposed in the article, the latch receiver receiving the latch projecting from the linkage member and being engageable therewith,
   a switching member slidably disposed in the lid member and having engageable ends to selectively place the engageable ends in an advanced position, in a retracted position inside the lid member, and in an intermediate position between the advanced position and the retract position;
   wherein when the engageable end of the switching member is set in the advanced position, the engageable end presses one of the latches in a direction against a biasing action to disengage said one of the latches from the latch receiver corresponding thereto to thereby open the lid member to one side.

2. The lid device openable from two sides according to claim 1, wherein the linkage members are arranged such that when the lid member is opened to one side, one linkage member is disposed on the article horizontally and the other linkage member opens together with the lid, while when the lid member is opened on the other side, the other linkage member is disposed on the article horizontally and the one linkage member opens together with the lid.

3. The lid device openable from two sides according to claim 1, wherein the switching member includes a first engageable end for the first linkage member and a second engageable end for the second linkage member so that when the first engageable end of the switching member is moved to the advanced position, the second engageable end moves to the retracted position, and when the second engageable end of the switching member is moved to the advanced position, the first engageable end moves to the retracted position.

4. The lid device openable from two sides according to claim 3, further comprising:
   a control member attached to the switching member for sliding the switching member, the control member being disposed in the lid member so as to slide the switching member in two directions perpendicular to the first and second linkage members, and
   a return system, which pushes the control member back to a reference position when the control member has been moved from the reference position, wherein the first engageable end and the second engageable end of the switching member are set in the intermediate position when the control member is set in the reference position.

5. The lid device openable from two sides according to claim 1, wherein the lid member is constantly biased in a direction to swing and open about the second shaft by a torsion coil spring disposed around the second shaft of the linkage member.

6. The lid device openable from two sides according to claim 5, further comprising a damper disposed laterally of the second shaft, the damper having a pinion engaging a gear disposed in one of the linkage members swingable about the second shaft to apply a braking force to the pinion.

7. A center console box comprising a lid member formed as a lid, and an article formed as a box of an automobile, the lid member and the article in the lid device being defined in claim 1.

* * * * *